May 6, 1930.  J. RIFE  1,756,955
CUTTING TOOL
Filed Nov. 7, 1927
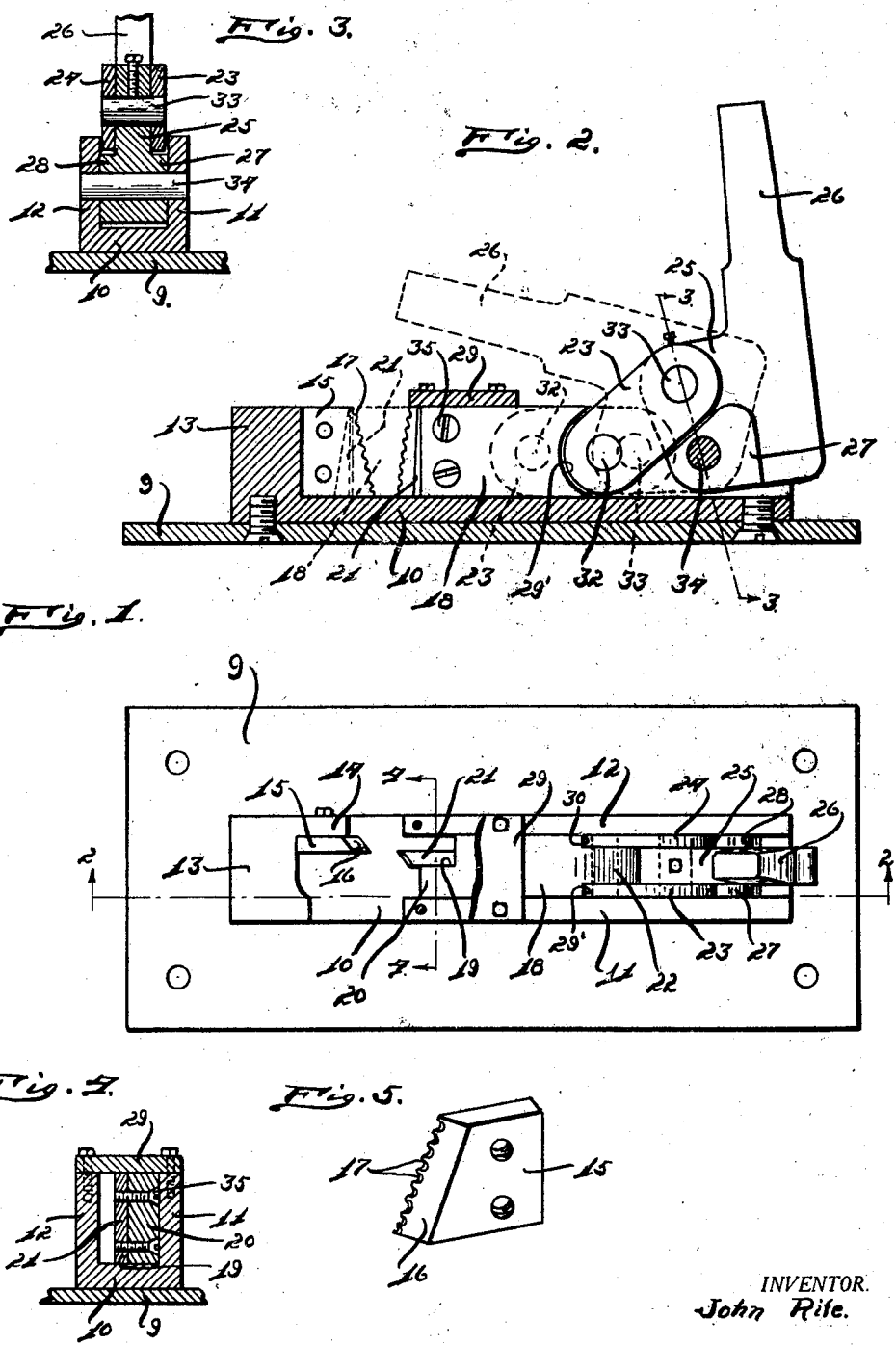
INVENTOR.
John Rife.
BY
ATTORNEY Patented May 6, 1930

1,756,955

UNITED STATES PATENT OFFICE

JOHN RIFE, OF DETROIT, MICHIGAN

CUTTING TOOL

Application filed November 7, 1927. Serial No. 231,537.

My invention relates to a new and useful improvement in a cutting tool adapted for use particularly in cutting heavy cables, bolts, and similar articles.

It is an object of the present invention to provide a device of this class which will be durable in structure, easily and quickly operated, one that is provided with a maximum power and leverage, and economically manufactured.

Another object of the invention is the provision of a tool of this class having a pair of cooperating cutting elements, one of said elements being stationary and abutted against a stationary part of the base.

Another object of the invention is the provision of a tool of this class in which the movable cutting member will be driven at all times primarily by a cam formed on the operating handle thereof, thus relieving the bolts, which serve to connect the links together, of a large portion of the strain which ordinarily would be exerted thereon.

Other objects will appear hereinafter.

The invention consists in the combination and arrangement of parts hereinafter described and claimed.

The invention will be best understood by reference to the accompanying drawings which form a part of this specification and in which, Fig. 1 is a top plan view of the invention.

Fig. 2 is a sectional view taken on substantially line 2—2 of Fig. 1.

Fig. 3 is a sectional view taken on line 3—3 of Fig. 2.

Fig. 4 is a sectional view taken on line 4—4 of Fig. 1.

Fig. 5 is a perspective view of one of the cutting elements.

In the drawings I have illustrated the invention mounted on a supporting plate 9. The invention comprises a base 10. This base is provided at opposite sides, adjacent its rear end, with a pair of upwardly extending guide plates 11 and 12, these guide plates being preferably formed integral with the base 10. At the forward side of the base 10 is formed a block 13, projecting rearwardly from which is the upwardly extending plate 14 upon which is fixedly mounted a cutting element 15, this cutting element comprising a plate having a bevelled face 16 at its connecting end, this face being provided with teeth 17. When secured to the plate 14 which is formed integral with the base 10 and the block 13, the cutting element 15 abuts against the block 13.

Slidably positioned between the guide plates 11 and 12 is the thrust member 18 having its forward end cut away as at 19 to provide the forwardly extending portion 20, to which is secured the cutting element 21, this cutting element being formed similar in structure to the cutting element 15.

It will be noted that the ends of these cutting elements, as shown in Fig. 2, do not extend vertically, but are inclined, the lower ends of each of the cutting elements being longer than the upper ends, so that in the cutting operation the lower ends will first engage the material operated upon. This thrust member is provided at its rearward end with a reduced portion 22, pivotally connected to which, at opposite sides, are links 23 and 24, these links being pivotally connected to a plate 25, extending outwardly from the upper end of which is the operating handle 26. As shown in Fig. 1, the links 23 and 24 extend parallel and are spaced apart so that they snugly engage between the guide plates 11 and 12. Formed on opposite sides of the plate 25 are the projections 27 and 28.

A cover plate 29 is secured on the upper surface of the guide plates 11 and 12 at their forward ends, so as to prevent the thrust member 18 from rising when the material to be cut is engaged by the cutting elements 15 and 21.

In operation, the handle 26 which may be provided with a suitable extension is raised to the position shown in full lines in Fig. 2, thus moving the cutting elements into their position, as shown in full lines. After the material has been placed between the cutting elements the handle 26 is rocked into the position shown in dotted lines in Fig. 2, thus moving the cutting elements so that they overlap, as shown in dotted lines. In this rocking movement of the handle 26 the thrust member 18 is slid forwardly between the plates 11 and 12 through the pressure brought to bear upon the thrust member by the links 23 and 24. The thrust member is cut away at opposite sides as at 29' and 30 so that the thrust delivered to the thrust member by the links 23 and 24 is not transmitted through the pin 32 which serves to bind these parts in pivotal relation, but is transmitted through engagement with a shoulder formed at the cut away portions 29' and 30. In the incipient forward movement of the thrust member 18 some strain is exerted upon the pin 33, but as the links 23 and 24 move forwardly and engage the rear edge of the cover plate 29, the links are forced downwardly to lie between the plates 11 and 12, and as this downward movement takes effect the ends of the links engage the shoulders or cam surfaces 27 and 28, so that these pins 32 and 33 are relieved of the pressure upon the thrust member. A pin 34 projects through the side plates 23 and 24 and through the plate 25, this pin 34 being of sufficient strength to resist the strain exerted upon it.

In order to remove the cutting element 15 it is but necessary to unthread the screws which are projected through the portion 14 and thread into the cutting element. Similarly to remove the cutting element 21, it is but necessary to remove the cover plate 29, raise the thrust member 18 upwardly and remove the screws 35.

With a cutter of this class constructed as described there is a maximum amount of pressure delivered to the cutting elements with a minimum effort, and a most efficient and durable device is provided.

Furthermore the method of mounting the various parts together permits a quick and easy assembly of these parts, while at the same time, a removal and replacement of the cutting elements when desired may be easily and quickly effected.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A cutting tool of the class described comprising: a base; a pair of guide plates integral with and projecting upwardly from opposite sides of said base, adjacent the rearward end thereof; an abutment block integral with and projecting upwardly from said base adjacent its forward end; a rearwardly extending plate on the rear side of said abutment block adjacent one edge thereof; a cutting element secured to the inner face of said rearwardly projecting plate and engaging at its forward edge said abutment block; a thrust member slidably mounted between said plates, the forward end thereof being cut away; a cooperating cutting element secured on said thrust member at said cut away portion, the rear edge thereof engaging the main body of said thrust member; a reduced portion on the rear end of said thrust member, said thrust member having shoulders at opposite sides thereof; a link pivotally connected at one and at opposite sides of said reduced portion; a lever rockingly mounted between said guide plates at the rear end thereof; a shoulder forming projection on opposite faces of said lever, said links being pivoted to said lever at their opposite ends and adapted for engaging said shoulder forming projections upon rocking movement of said lever in one direction, said links, upon said rocking movement, engaging the shoulders formed at opposite sides of said reduced portion.

2. A cutting tool of the class described comprising: a base; a pair of guide plates integral with and projecting upwardly from opposite sides of said base, adjacent the rearward end thereof; an abutment block integral with and projecting upwardly from said base, adjacent its forward end; a rearwardly extending plate on the rear side of said abutment block, adjacent one edge thereof; a cutting element secured to the inner face of said rearwardly projecting plate and engaging at its forward edge said abutment block; a thrust member slidably mounted between said plates, the forward end thereof being cut away; a cooperating cutting element secured on said thrust member at said cut away portion, the rear edge thereof engaging the main body of said thrust member; a reduced portion on the rear end of said thrust member, said thrust member having shoulders at opposite sides thereof; a link pivotally connected at one end at opposite sides of said reduced portion; a lever rockingly mounted between said guide plates at the rear end thereof; a shoulder forming projection on opposite faces of said lever, said links being pivoted to said lever at their opposite ends and adapted for engaging said shoulder forming projections upon rocking movement of said lever in one direction, said links, upon said rocking movement, engaging the shoulders formed at opposite sides of said reduced portion; and a cover plate mounted on the upper surfaces of said guide plates at their forward ends for preventing upward movement of said thrust member relatively to said guide plates.

In testimony whereof I have signed the foregoing specification.

JOHN RIFE.